Patented Dec. 23, 1941

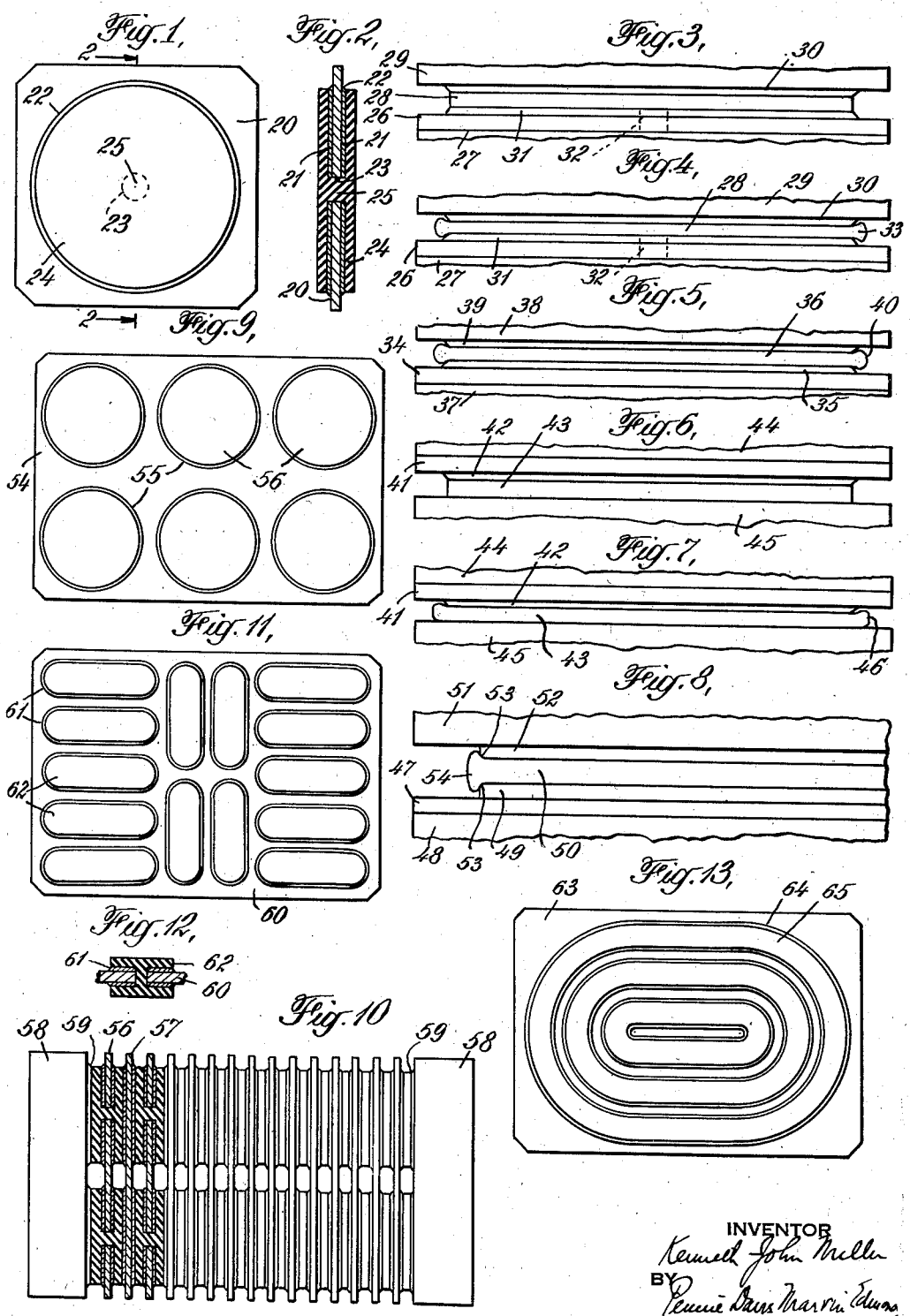

2,267,475

UNITED STATES PATENT OFFICE 2,267,475

CUSHIONING MECHANISM

Kenneth J. Miller, Pittsburgh, Pa., assignor to Waugh Equipment Company, New York, N. Y., a corporation of Maine Application December 22, 1939, Serial No. 310,560

7 Claims. (Cl. 267—63)

This invention relates to cushioning mechanisms of the kind in which rubber or similar resilient material is employed as the active cushioning agent which is disposed between compression members, of which both are relatively movable, or one movable and the other stationary. More particularly, the invention is concerned with a new cushioning mechanism in which a resilient element of novel construction is employed, the mechanism having operating characteristics which produce desirable results not heretofore obtainable with devices of this type.

Resilient elements containing rubber or similar material have heretofore ordinarily included a mounting or support, such as a metal plate, and blocks of rubber of various shapes and sizes mounted in alignment on the opposite faces thereof. In one such rubber spring which has been employed to a considerable extent in buffers and draft gears on railway cars, the rubber blocks are endless and in the form of concentric rings of generally rectangular section secured on opposite faces of a steel plate by portions of the rubber which extend through openings through the plate to connect aligned rings. In another type of spring, the rubber masses are elongated blocks lying side by side with their axes parallel and secured in place in the same manner. In a cushioning mechanism, such as a draft gear, a number of these rubber springs, which are the active elements of the mechanism, are mounted in alternation with plain spacer plates, which serve as inactive elements, and usually follower blocks of substantial thickness are provided at the ends of the group of elements.

Draft gears containing rubber springs of the type heretofore commonly used are superior to friction gears, particularly for passenger service, in that their action is smoother and more uniform, but the operating characteristics of such rubber gears are not ideal in two principal respects. Thus, a rubber gear offers little resistance to compression by light loads and it has a travel during the initial part of its cushioning operation which may be objectionably long. Also, after the rubber has undergone compression resulting in a reduction of the order of 50% to 60% in its original thickness, its resistance increases so that the deformation produced by each added unit of load is correspondingly decreased. Under heavy loads, therefore, a spring gear may give little cushioning effect and its action may approach that of a friction gear which has gone solid.

The reasons for present rubber gears having the operating characteristics described is that the springs employed therein include blocks of rubber of relatively great thickness in relation to the areas of their compression faces and such blocks offer little resistance to compression by light loads. Also, these blocks are subjected to compression in such manner that as the compression proceeds and the block is deformed with its volume remaining approximately constant, the block automatically presents an increasing area of support to the compressing member. As a result of such increase in the area of support by the block and the corresponding resistance to compression produced thereby, the effectiveness of each added unit of load in producing deformation is correspondingly decreased.

The present invention is directed to the provision of a cushioning mechanism having operating characteristics superior to those of rubber spring cushioning devices as heretofore made and the improved action of the new cushioning mechanism results from the use therein of an active element containing rubber or other resilient material, which is of novel construction. The new mechanism offers substantial resistance to compression by light loads and thus has a cushioning action which is immediately effective as a load is applied. In addition, the mechanism may be so constructed as to offer resistance to increasing compressive forces which may be fairly represented by a straight line function throughout the application of loads likely to be encountered in normal use of the mechanism. The new cushioning mechanism consequently has operating characteristics similar to those of a metallic spring throughout the operating range thereof and under normal conditions of use, the mechanism of the invention offers a substantially constant resistance and thus produces a desirable cushioning effect from one end of its operating range to the other.

The results above set forth are obtained by the use in the new mechanism of one or more active cushioning elements consisting of a supporting member and one or more blocks of rubber or similar resilient material mounted thereon, the supporting member advantageously taking the form of a metal plate formed with a boss for each block of resilient material. In one form, the resilient blocks are of cylindrical form having a diameter several times greater than their thickness and they are mounted on the end surfaces of the bosses. The area of such end surface is not substantially greater than that of the end surface of the block in the uncompressed condition of the latter and preferably the end surface of the boss and that of the block when uncompressed are the same.

In its simplest form, a cushioning device constructed in accordance with the principles of the invention includes a single active element consisting of a plate having a block of resilient material mounted on a boss on one surface thereof. This plate is disposed between compression members of which both may be stationary or one movable and one stationary. The compression members may both have plane surfaces, but preferably the surface which contacts with the block has a boss, the end surface of which contacts with the block and has an area which is the same as that of the surface of the block, when the latter is uncompressed. With this arrangement, upon the application through the compression members of a force tending to compress the block, deformation of the latter takes place and this results in a quantity of the resilient material being forced laterally from between the surfaces through which the force is applied. That portion of the block which is thus moved outwardly from between the surfaces engaging the block at once becomes substantially inactive and as the compression of the block proceeds, the approach of one compression member toward the other is continuously resisted by a column of resilient material which is of constant cross-sectional area. Since, with the construction described, the areas of the active portion of the block presented to the compression members and the cross-sectional area of the active portion remain constant, each added increment of load is effective to produce substantially the same deformation of the active portion throughout the range of normal operation. Also the formation of the block with its end surfaces having a diameter much greater than its height enables the block to offer substantial resistance to compression by light loads.

For a better understanding of the invention, reference may be had to the accompanying drawing in which:

Fig. 1 is a view in front elevation of one form of the new resilient element;

Fig. 2 is a sectional view on the line 2—2 of Fig. 1;

Fig. 3 is a view in side elevation of one form of cushioning device in which the new resilient element is employed;

Fig. 4 is a view similar to Fig. 3 showing the condition of the parts upon the application of a load;

Fig. 5 is a view similar to Fig. 4 showing the condition of the parts of a slightly modified construction under load;

Fig. 6 is a view similar to Fig. 3 showing a modified construction.

Fig. 7 is a view similar to Fig. 6 showing the condition of the parts upon the application of a load;

Fig. 8 is a view similar to Fig. 4 showing the condition of the parts of a modified device upon the application of a load;

Fig. 9 is a view in front elevation of another form of resilient element of the invention.

Fig. 10 is a view partly in side elevation and partly in section of a cushioning device in which the resilient elements of Fig. 9 are employed;

Fig. 11 is a view in front elevation of another form of cushioning element of the invention;

Fig. 12 is a fragmentary sectional view illustrating the construction of the element of Fig. 11; and Fig. 13 is a view in front elevation of another form of resilient element of the invention.

Referring to the drawing, the resilient element illustrated in Fig. 1 comprises a supporting member 20 which may conveniently take the form of a plate of any suitable material, steel being preferred. This plate is provided with central bosses 21 on opposite faces, and these bosses may be formed as integral parts of the plate or may be additional pieces of metal secured to the faces of the plate by welding or in any other suitable manner. The bosses shown are of circular form and the faces thereof in contact with the plate are of greater diameter than the outer faces, the lateral surfaces 22 of the bosses having a flare, as shown. The plate and bosses have aligned central openings forming a passage 23 therethrough, and mounted on the ends of the bosses are blocks 24 of resilient material which are connected together by a plug 25 of the material which extends through and fills the passage 23. The blocks 24 are of cylindrical form and in their uncompressed condition, the inner faces of the blocks in contact with the ends of the bosses have the same area as the bosses. The thickness of the blocks is substantially less than that of their diameter, as, for example, each block may have a diameter of 3.625″ and a thickness of 0.3″. Bosses on which these blocks are mounted and which have outer faces of a diameter of 3.625″, a thickness of 0.0625″, and inner faces of a diameter of 3.875″, are suitable. The plate on which the blocks are mounted may vary in thickness, and a steel plate 0.09375″ thick is satisfactory.

In its simplest form, the resilient element of the invention comprises a plate such as that illustrated in Fig. 1, having a boss on one surface thereof and a block of rubber mounted on the end surface of the boss. In use, this element is placed with the flat surface of its plate 26 in contact with the flat surface of a compression member 27 which may be stationary or movable. The rubber block 28 of the element then faces a compression member 29 which is provided with a boss 30 in all respects similar to the boss 31 on plate 26. The parts in this relation are illustrated in Fig. 3 and when the compression members begin to approach one another, the block becomes deformed, as illustrated in Fig. 4. In the construction shown, the block is held in place on the plate 26 by an integral plug 32 of rubber which extends through aligned openings in the boss 31 and plate 26, and the surface of the block in contact with the surface of the boss is not affixed thereto. When compression is applied, the outer part of the block around the plug is forced outwardly and relative movement between the contacting surfaces of the block and the bosses 30 and 31 occurs. The amount of such movement depends on the nature of the surfaces of the bosses and while the movement is going on, deformation of the block is also occurring so that a portion 33 of the block extending along the entire periphery thereof is forced outwardly from between the bosses 30 and 31. The portion of the block thus forced from between the two bosses is free of the bosses and of the surfaces to which the bosses are attached, so that it becomes substantially inactive, and the active portion of the block, which provides almost the entire support for the applied load, is a column of rubber having the same transverse dimensions and end areas as the block in its original uncompressed condition.

Since the block has a relatively small thickness as compared with its transverse dimensions, it offers resistance immediately upon the application of a compressing load and, since the peripheral portion of the block forced from between the compressing surfaces by the deformation of the block becomes substantially inactive, it will be apparent that each increment of load is effective to produce further deformation of the active portion of the block. The block thus has an effective cushioning action throughout its normal range of operation and does not have a resistance to deformation which increases substantially as the load is increased. There is some slight increase in resistance by reason of the tendency of the peripheral portion 33 of the block, which has been forced from between the compressing surfaces, to return to its original condition, but this increase is not comparable with that which would be offered if the entire volume of the block remained active in resisting compression, regardless of the deformation of the block, as in the prior resilient elements.

In the construction shown in Fig. 5, the resilient element comprises a plate 34 having a boss 35 on which is mounted a block of rubber 36 which is affixed to the surface of the boss 35 as by means of a suitable cement. The plate rests upon a compression member 37 and force is applied to the block by a compression member 38 having a boss 39 similar to the boss 35. When a resilient element of this construction is subjected to compression, as shown in Fig. 5, the adhesion of the block to boss 35 prevents slipping of the block relative to the surface of the boss. However, the material initially forming the peripheral wall of the block is bulged outwardly, as indicated at 40, and the material thus displaced from between the bosses becomes inactive to resist compression. The displaced material in the Fig. 5 construction has a bulbous section differing somewhat from that of the material displaced from between the surfaces of the bosses, in the case of the element shown in Figs. 3 and 4.

In the constructions illustrated in Figs. 3, 4, and 5, compression is applied to the resilient element by means including a compression member which has a boss similar to that on which the rubber block of the element is mounted, and this is the preferred arrangement. However, for some purposes, it is satisfactory to employ a resilient element comprising a plate, a boss, and a rubber block mounted thereon which is placed between compression members having flat surfaces. This construction is illustrated in Figs. 6 and 7 wherein the resilient element shown comprises a plate 41 having a boss 42 on the end of which is mounted a rubber block 43. The plate lies between compression members 44, 45 having flat surfaces and with the rubber block in contact with one of those surfaces. When the compression members approach, the rubber block 43 is deformed and a peripheral portion 46 is forced outward. Since the block is mounted on the boss, this portion becomes inactive because it does not make contact with the surface of one member, although it remains in contact with the surface of the other. With such a resilient element employed in the manner illustrated, each unit of load added is effective to produce further deformation of the rubber.

In the constructions heretofore described, the boss on which the rubber block is mounted and the boss by which compression is applied to the block are illustrated as having inner and outer faces of different diameter and flaring rims. That construction is desirable because as the block is compressed and a portion forced from between the bosses, that portion expands around the edges of the faces of the bosses. If this edge is too sharp, injury may be done to the rubber and the provision of a flaring rim on each boss is desirable to prevent such injury. However, if desired, the construction illustrated in Fig. 8 may be used in which the resilient element includes a plate 47 resting on a compression member 48 and provided with a boss 49 on which a block of rubber 50 is mounted and the second compression member 51 includes a boss 52. Both bosses are formed with a curved rim 53, the curve causing the end and side walls of the bosses to merge gently. With this construction, the application of pressure to the block causes a portion 54 to be forced outwardly from between the bosses and the portion so forced out expands around the curved edges 53 of the bosses. The curvature of the bosses at the edge then prevents injury to the rubber.

Resilient elements of the invention, which comprise a single block of rubber, may be used for cushioning devices of light duty, but for heavy duty, the resilient elements employed include additional blocks of rubber mounted on each face of the supporting member. One such resilient element is shown in Fig. 9 and it includes a plate 54 provided with six bosses 55 on each face, the bosses being arranged in a double row. Mounted on the end of each boss is a cylindrical block of rubber 56. These blocks may be held in place by being affixed to the ends of their bosses, or aligned blocks on opposite faces of the plate may be connected by plugs of rubber passing through openings in the bosses and through the plate, as illustrated in Fig. 2.

Resilient elements shown in Fig. 9 may be employed as a cushioning unit in a railway draft gear and in such use, the unit is formed as illustrated in Fig. 10 and includes active and inactive elements arranged in alternation. In the device shown, there are eight active elements 56, each of the construction shown in Fig. 9, and seven inactive elements 57. Each inactive element comprises a plate and bosses similar to bosses 22, 55 mounted on the opposite faces thereof and in such position that each boss contacts with the end of a rubber block on an adjacent active element. At the ends of the group of active and inactive elements are follower blocks 58 which are provided with bosses 59 similar to bosses 22, 55. Bosses 59 contact with the rubber blocks of the adjacent active elements.

A single cushioning unit of the type described may be used in a draft gear in which case, the follower blocks contact with the draft stops and with the ends of the yoke connected to the coupler shank. Such a gear is single acting. If desired, two such cushioning units may be employed in the same gear, in which case, one follower block of each unit contacts with an abutment on the vehicle structure and the other follower block of each unit is in contact with the yoke. Such a gear is double acting, with one unit operating in buff and the other in draft.

In Fig. 11, there is shown a modified form of active element in which the supporting member consists of a plate 60 having bosses 61 mounted on opposite faces thereof, these bosses being of elongated form with rounded ends and having outer faces of less area than their faces in contact with the plate. Mounted on the outer face of each boss is a rubber block 62 and the blocks and their bosses may be employed in various arrangements. In the construction shown in Fig. 11, the plate, which is rectangular, is provided with two rows of five blocks each at each end and an intermediate group of four blocks lying with their axes transverse to the axes of the blocks in the end rows. With this construction, the relative positions of the blocks may be such that as the compression proceeds, the portions of the blocks which are forced outwardly relatively to their bosses may make contact and ultimately afford mutual support to one another so as to prevent an overload being applied to the resilient material.

In Fig. 13, there is illustrated another form of resilient element embodying the principles of the invention in which the supporting member includes a plate 63 having bosses 64 thereon, these bosses having the form of elongated endless rings mounted concentrically. The bosses have outer faces of less area than their inner faces and mounted on the outer face of each boss is an endless block 65 of rubber. The resilient element illustrated in Fig. 13, as well as those shown in Figs. 9 and 11, operate in the same manner as the element shown in Fig. 1, that is, in each case, the rubber blocks used have a relatively small thickness as compared to their transverse dimensions so that the blocks become immediately effective in resisting compression by light loads. Also, in each case, the mounting of the blocks is such that each added unit of load is effective to produce deformation and the elements consequently produce a cushioning effect throughout their normal range of operation.

In the resilient element of the invention, the active material has been referred to as rubber, but it is to be understood that this term is intended to apply to rubber compounds and also to natural or synthetic materials having resilient characteristics similar to those of rubber. The operating characteristics of the new element vary somewhat with changes in the nature of the resilient material employed, but these changes are relatively unimportant and do not have any substantial effect on the performance of the elements. Other slight variations in operating characteristics depend on whether the block of resilient material is affixed to its boss or mounted in position in such manner that the surface of the block may move relatively to the boss under compression. In the latter case, the character of the surface of the boss also has a slight effect on performance of the element depending, for example, on whether the boss has a smooth surface or a surface roughened as by galvanization.

While I have described the use of the resilient element illustrated in Fig. 9 in a cushioning unit forming part of a railway draft gear, it is to be understood that the other forms of resilient element illustrated and described may also be used for that purpose.

I claim:

1. A resilient element for cushioning purposes which comprises a plate of relatively incompressible material having aligned similar bosses on opposite faces thereof, each boss terminating in a compression surface, and a block of resilient material mounted on each compression surface, the surfaces of the blocks contacting with said compression surfaces being of not substantially less area than that of the corresponding compression surface, said bosses being located inwardly from the edge of said plate, whereby a space is provided outwardly of each boss and between the edges of each boss and the edge of the plate into which a quantity of the resilient material of the respective blocks may flow without being subjected to compressive force when said blocks are compressed sufficiently to cause lateral flow of the resilient material thereof, and the area of the active portion of the blocks presented to compression members will remain substantially constant.

2. In a cushioning device, the combination of a plurality of active elements separated by spacer elements, each active element including a plate of relatively incompressible material having a pair of aligned bosses on opposite faces thereof and a block of resilient material mounted on the free end of each boss, and each spacer element including a plate having bosses in contact with the free ends of the blocks on adjacent active elements, the surfaces of each block in contact with the faces of a pair of bosses having areas not substantially less than those of the bosses, the bosses on said plates being located inwardly from the edges thereof, whereby a space is provided outwardly of the bosses and between the edges of the bosses and the edges of the plates and spacer elements into which a quantity of the resilient material of the blocks may flow without being subjected to compressive force when said blocks are compressed sufficiently to cause lateral flow of the material thereof, and the area of the active portions of the blocks presented to said bosses for compression will remain substantially constant.

3. In a cushioning device, the combination of a plurality of active elements separated by spacer elements, each active element including a plate having frusto-conical bosses on opposite faces thereof and cylindrical blocks of resilient material mounted on the free ends of the bosses, the diameter of each block in uncompressed condition being not substantially less than that of the free end of the boss on which it is mounted, each spacer element including a plate having frusto-conical bosses engaging the free ends of the blocks on the adjacent active elements, the bosses on said plates being located inwardly from the edges thereof, whereby a space is provided outwardly of the bosses and between the edges of the bosses and the edges of the plates and spacer elements into which a quantity of the resilient material of the blocks may flow without being subjected to compressive force when said blocks are compressed sufficiently to cause lateral flow of the material thereof, and the area of the active portions of the blocks presented to said bosses for compression will remain substantially constant.

4. A resilient element for cushioning purposes, which comprises a plate of relatively incompressible material having a plurality of bosses on one face thereof, each boss terminating in a compression surface, and a block of resilient material mounted on each of said compression surfaces, the surfaces of the blocks in contact with the respective compression surfaces having areas which are not substantially less than that of the compression surfaces, the bosses being spaced one from another and being located inwardly from the edge of said plate, whereby spaces are provided between said bosses and outwardly of the bosses and between the edges of the bosses and the edge of the plate into which a quantity of the resilient material of the blocks may flow without being subjected to compressive force when said blocks are compressed sufficiently to cause lateral flow of the material thereof, and the area of the active portion of the blocks presented to said bosses for compression will remain substantially constant.

5. In a cushioning device, the combination of a plurality of active elements separated by spacer elements, each active element including a plate of relatively incompressible material having a plurality of bosses on opposite faces thereof, and a block of resilient material mounted on the free end of each boss, the surfaces of the blocks in contact with the respective bosses having areas which are not substantially less than that of the free end of the respective bosses, and each spacer element including a plate having bosses in contact with the free ends of the blocks on the adjacent active elements, the bosses on each side of said plates being spaced one from another and each being located inwardly from the edges of said plates, whereby spaces are provided between said bosses and outwardly of said bosses and between the edges of the bosses and the edge of the plates into which a quantity of the resilient material of the blocks may flow without being subjected to compressive force when said blocks are compressed sufficiently to cause lateral flow of the material thereof, and the area of the active portion of the blocks presented to said bosses for compression will remain substantially constant.

6. In a cushioning device, the combination of a plurality of alternately arranged active and spacer elements, each active element including a plate of relatively incompressible material having a plurality of aligned bosses on opposite faces thereof, and a block of resilient material mounted on the free end of each boss, the surfaces of the blocks in contact with the respective bosses having areas which are not substantially less than that of the free end of the respective bosses, and each spacer element including a plate having a planar portion in contact with the free ends of the blocks on the adjacent active elements, the bosses on each side of the plates of the active elements being spaced one from another and each being located inwardly from the edge of the plates on which it is formed, whereby spaces are provided between said bosses and outwardly of said bosses and between the edges of the bosses and the edge of the plates into which a quantity of the resilient material of the blocks may flow without being subjected to compressive force when said blocks are compressed sufficiently to cause lateral flow of the material thereof, and the area of the active portion of the blocks presented to said bosses for compression will remain substantially constant.

7. In a cushioning device, the combination of a plurality of plates of relatively incompressible material, each of said plates having a plurality of bosses on one face thereof, each boss terminating in a compression surface, a block of resilient material mounted on each of said compression surfaces, and a compression surface in contact with the free ends of said blocks, the surfaces of the blocks in contact with the respective compression surfaces of the bosses having areas not substantially less than that of the compression surfaces of the bosses, the bosses being spaced one from another and being located inwardly from the edge of said plate, whereby spaces are provided between said bosses and outwardly of the bosses and between the edges of the bosses and the edge of the plates on which they are mounted into which a quantity of the resilient material of the blocks may flow without being subjected to compressive force when said blocks are compressed sufficiently to cause lateral flow of the material thereof, and the area of the active portion of the blocks presented to the compression surfaces for compression will remain substantially constant.

KENNETH J. MILLER.